United States Patent
Aho et al.

(10) Patent No.: US 8,941,935 B1
(45) Date of Patent: Jan. 27, 2015

(54) SYSTEM AND METHOD FOR INITIATING REFRESH OPERATIONS

(71) Applicant: HGST Netherlands B.V., Amsterdam (NL)

(72) Inventors: Stephanie Louise Aho, Rochester, MN (US); Jonathan Darrel Coker, Rochester, MN (US); David Robison Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/203,142

(22) Filed: Mar. 10, 2014

(51) Int. Cl.
*G11B 27/36* (2006.01)

(52) U.S. Cl.
USPC .................................. 360/31; 360/48; 360/53

(58) Field of Classification Search
None
See application file for complete search history.

(56) References Cited

U.S. PATENT DOCUMENTS

| | | | | |
|---|---|---|---|---|
| 5,367,652 | A * | 11/1994 | Golden et al. | 711/4 |
| 7,672,072 | B1 | 3/2010 | Boyle et al. | |
| 7,872,822 | B1 | 1/2011 | Rothberg | |
| 7,974,029 | B2 | 7/2011 | Tsai et al. | |
| 8,014,097 | B1 * | 9/2011 | Sanvido | 360/60 |
| 8,174,780 | B1 * | 5/2012 | Tsai et al. | 360/31 |
| 8,320,067 | B1 | 11/2012 | Tsai et al. | |
| 8,345,370 | B2 * | 1/2013 | Inoue | 360/60 |
| 8,435,370 | B2 | 5/2013 | Kruger et al. | |
| 8,531,793 | B2 * | 9/2013 | Bandic et al. | 360/54 |
| 8,736,994 | B2 * | 5/2014 | Sugawara | 360/27 |
| 2009/0027799 | A1 | 1/2009 | Rothberg et al. | |
| 2009/0244775 | A1 * | 10/2009 | Ehrlich | 360/135 |
| 2010/0199106 | A1 * | 8/2010 | Iida | 713/189 |
| 2012/0226874 | A1 | 9/2012 | Kelkar et al. | |
| 2013/0254508 | A1 * | 9/2013 | Patil et al. | 711/170 |
| 2014/0071559 | A1 * | 3/2014 | Toda et al. | 360/55 |

OTHER PUBLICATIONS

Tanahashi et al., "Dual segregant perpendicular recording media with graded properties," IEEE Transactions on Magnetics (Feb. 2009) vol. 45, Issue 2: 799-804.

* cited by examiner

*Primary Examiner* — Dismery Mercedes
(74) *Attorney, Agent, or Firm* — Billion & Armtiage; Michael A. Collins

(57) ABSTRACT

A magnetic storage system includes a magnetic storage medium, a random-access memory (RAM), and a controller. The controller interfaces with both the magnetic storage medium and the RAM, and implements a refresh algorithm that determines when a data track on the magnetic storage medium should be refreshed. The controller maintains in the magnetic storage medium a plurality of finer-granularity damage count tables, each table having finer-granularity damage counts each representing damage to one or more sectors within each of the plurality of tracks associated with the table. The controller maintains in RAM a plurality of track-level damage count values, each associated with one of the plurality of data tracks and representing estimated damage to one of the plurality of data tracks. Based on data written to the plurality of data tracks, the controller utilizes finer-granularity damage count tables stored in the magnetic media to update the track-level damage.

22 Claims, 6 Drawing Sheets

SYSTEM AND METHOD FOR INITIATING REFRESH OPERATIONS

TECHNICAL FIELD

This disclosure relates generally to magnetic storage systems and in particular to initiating data-refresh operations in magnetic recording system.

BACKGROUND

To increase capacity of magnetic storage systems, efforts are continually made to increase magnetic recording density. For example, capacity may be increased by increasing track density (i.e., width of data tracks and/or distance between adjacent tracks). However, increased track density results in increased effects of adjacent-track interference (ATI) and far-track interference (FTI). That is, writing data to a particular data track can result in the degradation of signals written to adjacent or event non-adjacent data tracks. Repeated write operations to a track can result in irreversible damage to data written on these other tracks.

To prevent a loss of data, magnetic storage systems maintain in random access memory (RAM) a count of damage incurred by each data track. When that count reaches a pre-determine threshold level, the data track is "refreshed" by re-writing data to the data track. However, refresh operations take time and therefore degrade performance. They require an entire data track to be read from the magnetic media, and then re-written to the magnetic media to ensure any damage or errors sustained by the data track are remedied. The time required for a refresh operation is time that cannot be spent on other operations, resulting in a degradation of system performance.

It would therefore be beneficial to prevent initiation of refresh operations until required while maintaining the integrity of data stored to the magnetic media.

SUMMARY

In general, this disclosure describes techniques for the read back of data from a magnetic storage medium. In particular, this disclosure describes techniques for processing signals read-back from a disk of a hard disk drive.

According to one example of the disclosure, a method of refreshing data in a magnetic storage system is described for a magnetic storage system that includes a magnetic storage medium having a plurality of data tracks and RAM. The method includes storing, in RAM, data track update information that identifies by track and sector data written to the magnetic storage medium. The method further includes updating, in the RAM, a plurality of track-level damage count values based on the data track update information, wherein each track-level damage count value represents estimated damage to one of the plurality of data tracks. The method further includes updating a table of finer-granularity (i.e. more than one damage counter per track) damage counts based on the data track update information stored to the RAM, wherein the table of finer-granularity damage counts stores damage counts for individual sectors or groups of sectors associated with each of the plurality of data tracks associated with the table. The track-level damage count values associated with each of the plurality of data tracks are updated based on updates made to the table of finer-granularity damage counts.

According to another example of the disclosure, a magnetic storage system includes a magnetic storage medium, RAM, and a controller. The magnetic storage medium includes a plurality of data tracks, and is further divided into a plurality of sectors. The controller interfaces with both the magnetic storage medium and the RAM, and implements a refresh algorithm that determines when a data track on the magnetic storage medium should be refreshed. In particular, the controller maintains a plurality of finer-granularity damage count tables, each table having finer-granularity damage counts representing damage to a single sector or a plurality of sectors within each of the plurality of tracks associated with the table. In addition, the controller maintains in RAM a plurality of track-level damage count values, each associated with one of the plurality of data tracks and representing estimated damage to one of the plurality of data tracks. Based on data written to the plurality of data tracks, the controller utilizes finer-granularity damage count tables to update the track-level damage count values used to determine when to initiate a refresh operation.

DETAILED DESCRIPTION

The present disclosure describes a system and method of implementing refresh operations in magnetic storage systems such as hard disk drives (HDD). In addition to maintaining in random access memory (RAM) a count of damage to each of the plurality of coarse partitions (e.g., data tracks)—so called coarse-level damage count tables—the system stores to the magnetic media a table of finer-granularity damage counts that represents damage to individual fine partitions (e.g., sectors) within each of the plurality of coarse partitions. The finer-granularity damage count tables are finer-grain (i.e., more detailed), and as such must be stored to the magnetic media itself rather than the RAM due to memory requirements. The damage counts maintained in RAM are not as accurate as the finer-granularity damage counts, and almost always overestimate actual damage to a particular coarse partition. While refresh operations are still initiated based on the coarse-level damage counts stored in RAM, an embodiment of the present invention updates these coarse-level damage counts with finer-granularity damage counts.

However, the time required for accessing the finer-granularity damage counts maintained on the magnetic media is higher than accessing coarse-level damage counts maintained in the RAM. An algorithm is utilized to determine when to access the finer-granularity damage count tables to update the coarse-level damage count stored on RAM. A benefit of the system is more accurate accounting of damage counts maintained in the RAM, and as a result fewer refreshes than are required using only coarse-level damage counts. For purposes of this discussion, each coarse partition corresponds with a single data track, although in other embodiments a coarse partition may refer to a collection of data tracks or, conversely, a portion of a single data track. Likewise, fine partitions correspond with one of the plurality of sectors that make up each data track, although in other embodiments fine partitions may refer to any partition of the magnetic media that is finer or more detailed than the corresponding coarse partition. In addition, the present invention describes and illustrates data tracks as concentric, but it should be understood that data tracks may be either concentric and/or spiraled depending on the embodiment.

Figure 1:
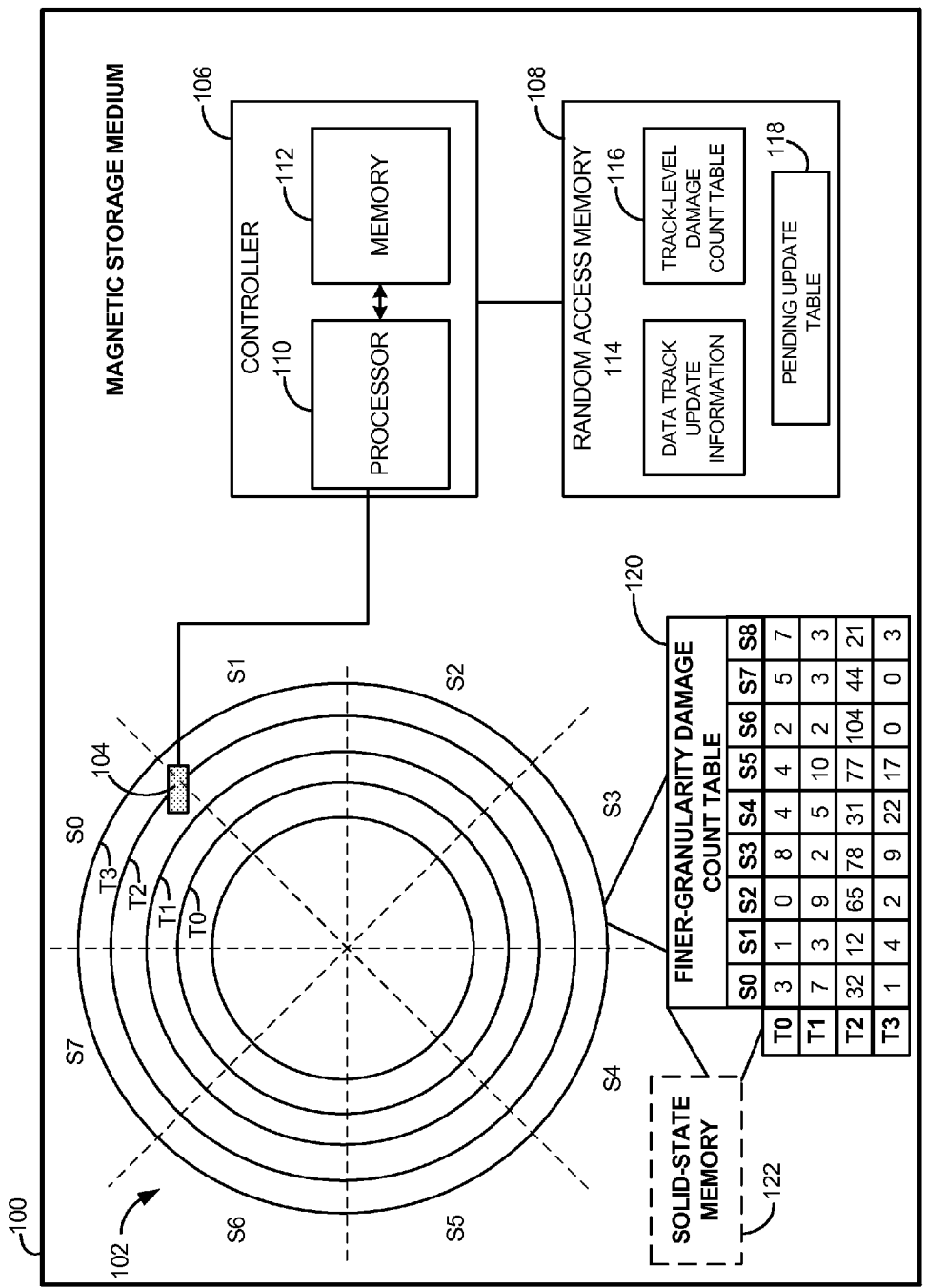
FIG. 1 is a block diagram of a magnetic storage system according to an embodiment of the present invention.

FIG. 1 is a block diagram of magnetic storage system 100 according to an embodiment of the present invention. In one embodiment, system 100 is a hard disk drive (HDD) system. System 100 includes non-volatile memory that includes, at least, magnetic media 102, read/write transducer 104, controller 106, and random access memory 108. In some embodiments, system 100 further includes other types of non-volatile memory such as solid-state memory 122. Magnetic media 102 includes a plurality of concentric data tracks. For the sake of simplicity, only four such data tracks labeled T0, T1, T2, and T3 are illustrated in the embodiment shown in FIG. 1, although in actuality magnetic media 102 would be comprised of many more such data tracks. In addition, magnetic media 102 is divided into a plurality of sectors labeled S0-S7. Once again, for the sake of simplicity, only eight such sectors are shown, although in actuality magnetic media 102 would be comprised of many more such sectors. Although the embodiment described with respect to FIG. 1 is directed to a traditional hard disk drive, it should be understood that the present invention may be utilized in other types of magnetic storage systems that may utilize, in addition to non-volatile memory in the form of magnetic media 102, other types of non-volatile memory such as solid-state devices 122 (e.g., NAND flash chips, NOR flash chips, phase change memory, MRAM memory, etc.). For example, a magnetic storage system may utilize magnetic media 102 for user data, and solid-state memory 122 for storing miscellaneous data and parameter information, high priority user data, or combinations thereof.

Read/write transducer 104 is mechanically positioned over one or more of the data tracks, and allows data to be written to and read from a selected data track. For example, in the embodiment shown in FIG. 1, read/write transducer 104 is positioned over data track T2, allowing data to be read from or written to this data track. In addition, read/write transducer 104 writes data to particular sectors associated with a selected data track. For example, in the embodiment shown in FIG. 1, read/write transducer 104 is positioned to write (or read) data associated with sector S0.

Controller 106 includes processor 110 and memory 112. Controller 106 controls read and write operations associated with magnetic media 102. In addition, as described in more detail below, controller 106 determines when to initiate refresh operations associated with magnetic media 102. To this end, processor 110 executes instructions stored in memory 112 to implement an algorithm for determining when to initiate refresh operations, as discussed in more detail below. In addition, processor 110 and memory 112 operate in conjunction with one another to manage read/write operations to magnetic media 102.

Random access memory (RAM) 108 it utilized by controller 106 to store information related to, among other things, refresh operations. In the embodiment shown in FIG. 1, RAM 108 includes data track update information 114, track-level damage count table 116, and pending update table 118. Although described as separate entities or tables of information, the information maintained within random access memory 108 may be organized in any number of ways. In general, data track update information 114 is a list that identifies by track and sector data written to magnetic media 102. Track-level damage count table 116 is a list of damage counts associated with each of the plurality of data tracks. As described in more detail below, track-level damage count table 116 is updated based on write operations performed with respect to each data track, and reflects the damage associated with tracks based on the effects of adjacent-track interference (ATI) and far-track interference (FTI). Pending update table 118 lists the plurality of finer-granularity damage count tables stored in magnetic media 102. In addition, pending update table 118 maintains a count, based on write operations made to the plurality of data tracks, of the total number of updates made to data tracks associated with each of the plurality of finer-granularity damage count tables.

In addition to data, magnetic media 102 maintains finer-granularity damage count tables 120, which stores multiple damage counts associated with each of the plurality of data tracks associated with the table. In the embodiment shown in FIG. 1, each finer-granularity damage count table 120 represents a grouping of data tracks, wherein the plurality of tables together include finer-granularity damage counts for each of the plurality of data tracks on the magnetic media. For example, in the embodiment shown in FIG. 1, a group of data tracks T0-T3 are included in one finer-granularity damage count table. Additional finer-granularity damage count tables would be stored for other groups of data tracks. Updates are made to finer-granularity damage count tables 120 by reading (via read/write transducer 104 and controller 106) one of the plurality of finer-granularity damage count tables 120 into RAM 108, and then updating the damage counts associated with the selected table based on data track update information 114 stored in RAM 108. Once updated, the finer-granularity damage count table 120 can be used to update track-level damage count table 116. The updated finer-granularity damage count table 120 is then written back to magnetic media 102 via read/write transducer 104.

In this way, finer-granularity damage count table 120 provides a more detailed (i.e., finer-grain) count of damage incurred by a given data track than that provided by the track-level damage count table 116 stored in RAM 108. For example, finer-granularity damage count table 120 may store damage counts for each sector associated with a given data track (i.e., single-sector damage counts), or for groups of sectors associated with a given data track. As a result of the additional information, finer-granularity damage count table 120 is too large to be maintained in RAM 108, and must therefore be allocated space on magnetic media 102. The cost associated with reading a selected finer-granularity damage count table from magnetic media 102, updating the selected finer-granularity damage count table, and writing the updated finer-granularity damage count table back to magnetic media 102 is approximately two orders of magnitude less per command than the average command execution time, and is therefore negligible.

Figure 2:
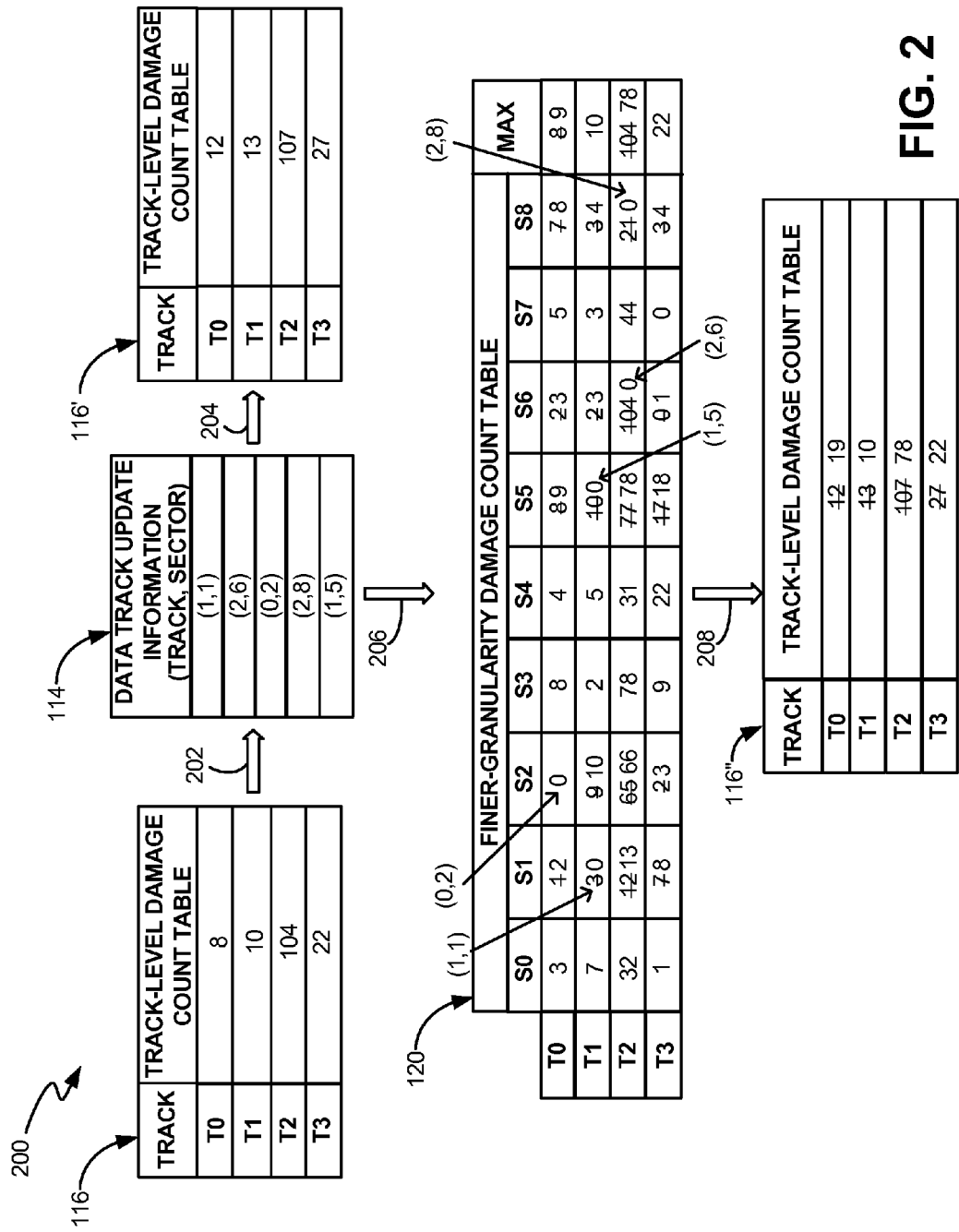
FIG. 2 is a hybrid flowchart illustrating maintenance of a finer-granularity damage count table and utilization of the finer-granularity damage count table to update the track-level damage counters according to an embodiment of the present invention.

In the embodiment shown in FIG. 1, finer-granularity damage count table 120 is stored to non-volatile memory. As described above, in one embodiment the table is stored to magnetic media 102. However, in other embodiments, other types of non-volatile memory may be utilized to store finer-granularity damage count table 120. For example, solid-state memory 122 may be utilized in combination with magnetic media 102, wherein finer-granularity damage count table 120 is stored to solid-state memory 122. Depending on the application, solid-state memory 122 may be utilized only to store miscellaneous data and parameter information, while in other embodiments solid-state memory 122 may be utilized to store at least a portion of the user data (e.g., high-priority user data). In yet another embodiment, solid-state memory 122 may include several different memory chips or types of memory. For example, one solid-state memory chip may be utilized for high priority user data while a separate solid-state memory chip may be used for storing miscellaneous data and parameter information. In each of these examples, solid-state memory 122 could additionally be utilized to store finer-granularity damage count table 120. Solid-state memory 122 may be implemented with NAND flash chips, NOR flash chips, phase change memory, MRAM memory, etc., as well as combinations thereof. Regardless of the location selected to store finer-granularity damage count table 120, the table will remain accessible to controller 106. FIG. 2 is a hybrid flowchart illustrating maintenance of finer-granularity damage count table 120 and utilization of finer-granularity damage count table 120 to update track-level damage count table 116 according to an embodiment of the present invention. Operations illustrated in FIG. 2 are performed by controller 106, in conjunction with magnetic media 102 and RAM 108 as part of the refresh algorithm. In particular, processor 110 executes instructions stored in memory 112 to implement the steps indicated in FIG. 2, which include data accesses to magnetic media 102 as well as data manipulation within RAM 108.

In the example illustrated in FIG. 2, track-level damage count table 116 includes damage counts for four tracks (data tracks T0-T3). Damage counts represent the effects of adjacent-track interference (ATI) and far-track interference (FTI) incurred by each data track based on write operations to other data tracks. For example, track-level damage count table 116 shows eight (8) counts of damage with respect to track T0. Likewise, track-level damage count table 116 shows ten (10) counts of damage with respect to track T1, one-hundred and four (104) counts of damage with respect to track T2, and twenty-two (22) counts of damage with respect to track T3. A refresh operation is initiated for a given track when the damage count stored in track-level damage count table 116 reaches a threshold level.

At step 202, a plurality of write operations are performed with respect to magnetic media 102 (shown in FIG. 1). For each write operation, information regarding the track and sector updated by the write operation is stored in RAM 108 (shown in FIG. 1) as part of data track update information 114. In the example shown in FIG. 2, the term (1,1) indicates that data was written to track T1, sector S1. Likewise, the term (2,6) indicates that data was written to track T2, sector S6.

At step 204, data track update information 114 is utilized to update track-level damage count table 116 (the updated track-level damage count table is illustrated as track-level damage count table 116'). For example, the damage count associated with track T0 (e.g., damage count=8) is updated based on data track information 114 to reflect a damage count of twelve (12), based on the four write operations made to data tracks other than data track T0 (i.e., data writes to tracks (1,1), (2,6), (2,8), and (1,5)). Damage counts associated with other data tracks are likewise updated based on the data track update information. For the sake of simplicity, damage counts in the example illustrated in FIG. 2 are simply incremented in response to each data write operation. In other embodiments, more sophisticated models may be used to increase damage count values based on ATI/FTI effects, with damage counts being increased appropriately. In traditional magnetic storage systems, this is the only mechanism used to determine whether to initiate a refresh operation. That is, track-level damage count values continue to update based on tracks written until a damage count value stored by track-level damage count table exceeds a threshold level, at which time a data refresh operation is initiated for that particular track.

As step 206, data track update information 114 is similarly utilized to update finer-granularity damage count table 120. Although not illustrated explicitly, this would require reading the finer-granularity damage count table associated with data tracks T0-T3 from magnetic media 102. In this example, finer-granularity damage count table 120 contains sector-level damage counters. In other embodiments, the damage counters maintained by finer-granularity damage count table 120 may represent damage in two or more sectors, so long as they remain finer grain (i.e., more detailed) than track-level damage count table 116 (shown in FIG. 1). Updates to finer-granularity damage count table 120 are indicated by new values written adjacent to crossed-out values. In addition, the data write operation responsible for the update is also illustrated. For each data track, the sector of the data track having the highest damage count value is selected as the maximum damage count value for that particular data track. For example, prior to updates, the maximum damage count value for data track T0 is eight (8), while the maximum damage count value for data track T2 is one-hundred and four (104). As discussed in more detail below, the maximum damage count value is the value used to update track-level damage count table 116.

For example, damage counts associated with sector S1 are updated based on the data write to track T1, sector S1 (indicated by the value (1,1)). As a result of this write operation, damage counts for each data track associated with sector S1 is incremented except for track T1 (the track that was written with the new data). The incrementing of damage counts reflects the effects of adjacent track interference (ATI) and far track interference (FTI) on tracks within the same sector as a written data track. Thus, damage counts associated with tracks T0, T2, and T3 (within sector S1) are all incremented. In addition, the writing of data to track T1, sector S1 results in the stored damage count associated with track T1, sector S1 being set equal to zero. This is because with the write of new data to this particular track and sector, any damaged data from track 1, sector 1 has been overwritten with fresh, un-damaged data.

Similar updates are made with respect to sectors S2, S5, S6, and S8 to reflect write operations to each of these sectors. In particular, the data write to track T2, sector S6 results in a relatively high damage count value (e.g., one-hundred and four) being reset to zero. Once again, because data was written to this track and sector, previous damage counts associated with this track and sector can be ignored because the data is new (i.e. has essentially been refreshed through the course of normal operation). One of the benefits of the finer-granularity damage count table with single-sector granularity is that data write operations to a specific sector can be used to reset to zero those tracks/sectors written with new information. As a result of this "zeroing" of certain damage count values, the maximum damage count value for a particular track may be reduced substantially. For example, with respect to data track T2, the previous maximum damage count was 104, based on the damage count associated with sector S6 of this track. However, because this track/sector was written with new data, the damage count associated with track T2, sector S6 is set to zero, and the maximum damage count associated with track T2 is seventy-eight (78), based on the damage count associated with track T2, sector S5.

At step 208, following all updates to finer-granularity damage count table 120, the maximum damage count values associated with each track is used to update track-level damage count table 116 (indicated as track-level damage count table 116"). For example, with respect to track T0 the damage count value is updated from twelve to nine. The decrease in damage count associated with track T0 is based on the higher precision associated with finer-granularity damage count table 120, which, in this example, attributes damage counts on a sector-by-sector basis rather than a track-by-track basis.

By utilizing finer-granularity damage counts, the present invention is not required to assume—as track-by-track systems do—a worst case scenario in which all write operations to a data track are to the same sector. Rather, by utilizing finer-granularity damage counts the present invention is able to provide more precision regarding damage incurred to a data track by write operations. Similarly, with respect to track T2 the damage count value is updated from one-hundred and seven (107) to seventy-eight (78). This decrease in damage count is attributable to the writing a track/sector with new data. In this way, use of finer-granularity damage count table 120 not only improves the estimation of damage associated with each data track by utilizing finer-grain information, but, in some instances, also accounts for self-healing of data tracks based on new data write operations affecting only a portion of the data track (e.g., a single sector of that data track).

Following updates to both finer-granularity damage count table 120 and track-level damage count table 116, the finer-granularity damage count table 120 is stored to magnetic media 102. Track-level damage count table 116 remains stored in RAM 108, and is utilized to determine when to initiate refresh operations.

Figure 3:
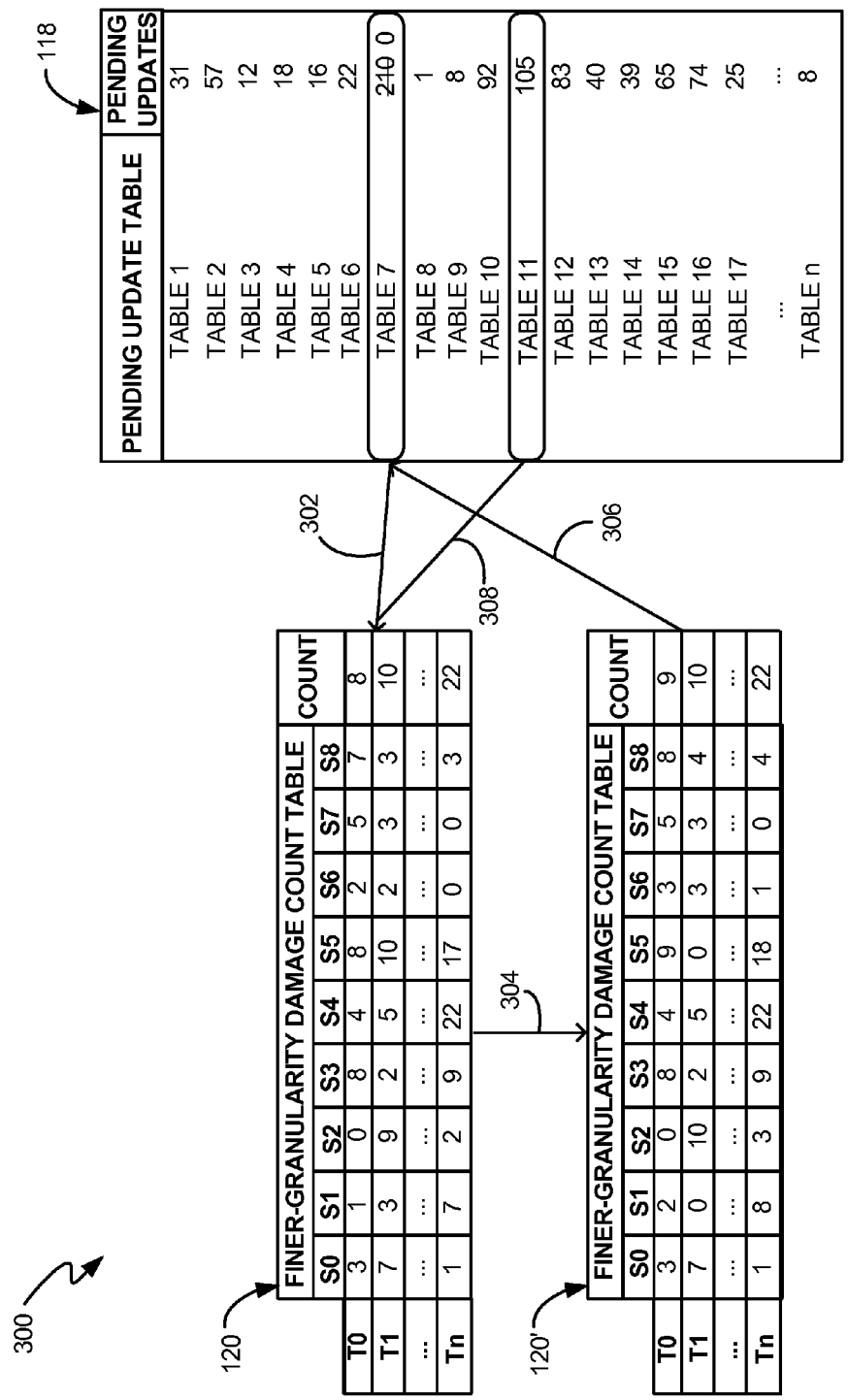
FIG. 3 is a hybrid flowchart illustrating maintenance of a pending update table utilized to select the next finer-granularity damage count table to update according to an embodiment of the present invention.

FIG. 3 is a hybrid flowchart illustrating maintenance of pending update table 118 utilized to select the next finer-granularity damage count table to update according to an embodiment of the present invention. As described with respect to FIG. 2, operations illustrated in FIG. 3 are performed by controller 106, in conjunction with magnetic media 102 and RAM 108 as part of the refresh algorithm.

Because updates to finer-granularity damage count tables require reading and writing to and from magnetic media 102 (shown in FIG. 1), which requires additional operation time, it is desirable to update those finer-granularity damage count tables that will have the largest impact on track-level damage count tables 116. Pending update tables 118 includes a list of each finer-granularity damage count tables 120 stored on magnetic media 102 (shown in FIG. 1) along with a count of the total number of updates (i.e., write operations) made to data tracks associated with each finer-granularity damage count table. For example, a write operation to a data track associated with finer-granularity damage count table 1 results in the incrementing of the pending updates associated with this table. The finer-granularity damage count table having the highest number of pending updates is selected to be updated. For example, in the embodiment shown in FIG. 3, finer-granularity damage count table 7 has 210 pending updates—more than any other table—and is therefore selected for updated.

At step 302, controller 106 (shown in FIG. 1) reads from magnetic media 102 (also shown in FIG. 1) a selected finer-granularity damage count table. In one embodiment, during the update process, the finer-granularity damage count table is stored to RAM 108 (shown in FIG. 1).

At step 304, the selected finer-granularity damage count table is updated based on stored data track information 114 and the updated finer-granularity damage count table is used to update the track-level damage count table as described with respect to FIG. 2. Data track information unique to the selected finer-granularity damage count table is then deleted from data track information 114. At step 306, controller 106 writes the updated finer-granularity damage count table to magnetic media 102 and resets pending updates associated with the selected finer-granularity damage count table—in this case, table 7—to zero to allow another table to be read. In one embodiment, the updated finer-granularity damage count table is not written to magnetic media 102 immediately, but rather is maintained in RAM until another finer-granularity damage count table is selected for updating. For example, in one embodiment, the updated finer-granularity damage count table is maintained in RAM until the amount of information in data track information 114 reaches a threshold value, indicating that the next finer-granularity damage count table (identified by the maximum of pending update table 118) should be selected for updating.

At step 308, the finer-granularity damage count table having the next highest number of pending updates—in this case, table 11—is selected for updating. The process repeats continually during normal operation of the magnetic storage system 100 (shown in FIG. 1). In this way, finer-granularity damage count tables having the most pending updates (i.e., write operations since a last update) are continually selected for updating.

Figure 4:
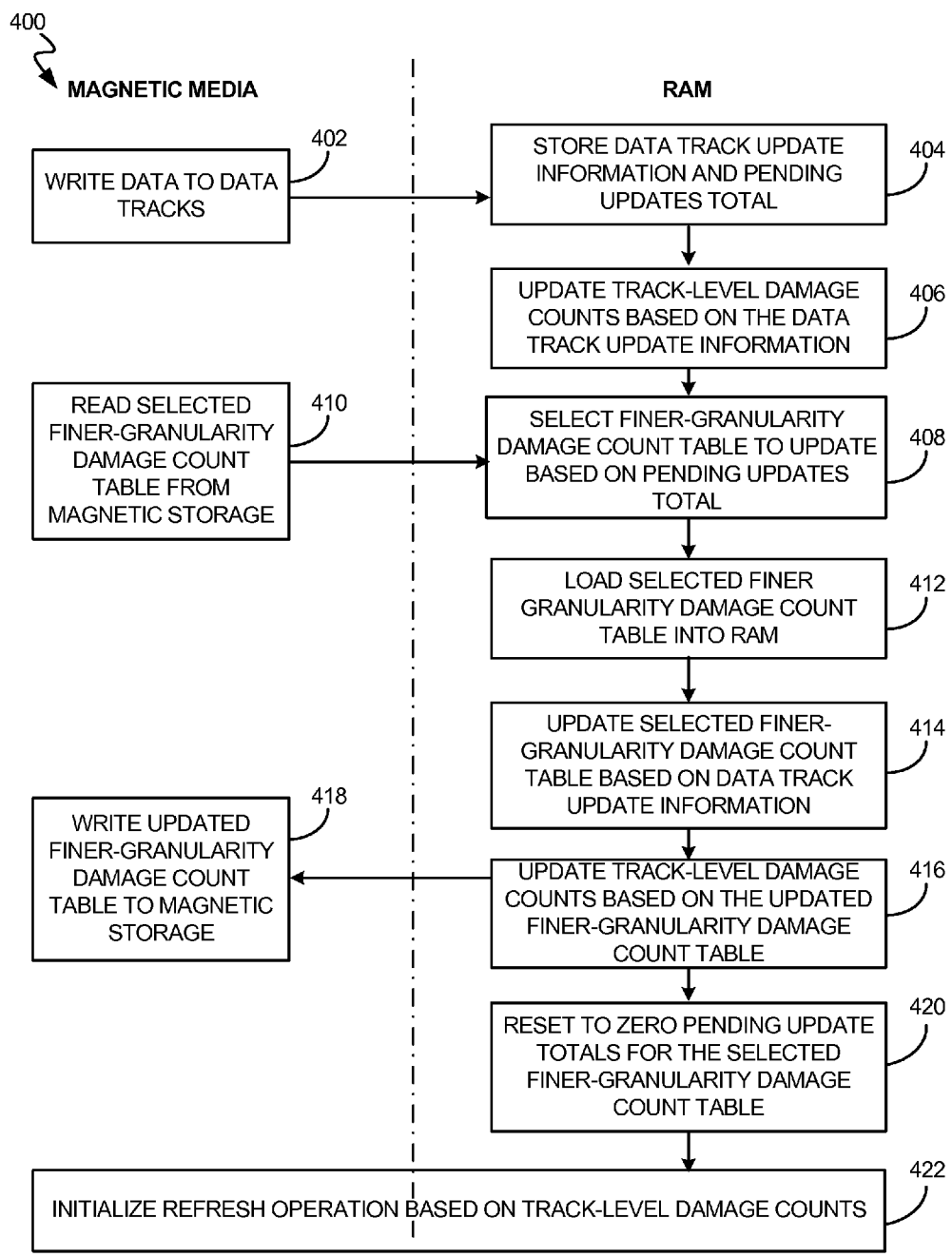
FIG. 4 is a flowchart illustrating a method of refreshing data in a magnetic storage system according to an embodiment of the present invention.

FIG. 4 is a flowchart illustrating a method 400 of refreshing data in a magnetic storage system according to an embodiment of the present invention. The flowchart is divided into two columns, with the left-most column representing steps that include reading and/or writing to magnetic media 102 (shown in FIG. 1) and the right-most column representing steps implemented with respect to data stored on RAM 108. The numbering of the steps described with respect to method 400 does not imply a sequence or order in which the steps must be performed. In particular, a number of steps may be performed concurrently with one another.

At step 402, data is written to data tracks located on magnetic media 102. At step 404, data track update information 114 (shown in FIG. 1) is updated based on the data written to magnetic media 102. Data track update information identifies data write operations to magnetic media 102 by both track and sector. In addition, at step 404, pending update table 118 is updated based on data written to magnetic media 102. For example, for each data write operation, a pending update total is incremented for the finer-granularity damage count table corresponding with the particular data track written. Note, this does not include finer-granularity damage count table 120, which remain stored on magnetic media 102 until selected for updating. Rather, this relates only to pending update totals maintained for each finer-granularity damage count table.

At step 406, track-level damage count table 116 (shown in FIG. 1) is updated based on the data written to magnetic media 102. As described with respect to FIG. 2, for each write operation to a particular data track, damage counts are incremented for data tracks affected through either adjacent track interference (ATI) or far-track interference (FTI). This may be based on modeling of ATI/FTI effects, or other means of assigning damage counts based on write operations.

At step 408, one of the plurality finer-granularity damage count tables 120 is selected for updating based on the pending update totals stored by pending update table 118. In one embodiment, the finer-granularity damage count table having the highest number of pending update totals is selected for updating.

At step 410, the selected finer-granularity damage count table 120 is read from magnetic media 102. At step 412, the selected finer-granularity damage count table 120 read from magnetic media 102 is loaded into RAM 108 for updating.

At step 414, the selected finer-granularity damage count table 120 is updated based on data track information 114 (shown in FIG. 1) and the now updated writes unique to the selected finer-granularity damage count table are removed from data track information 114. In particular, data track information—identifying by track/sector data write operations associated with the selected table—is utilized to update finer-grain damage to each of the plurality of tracks associated with the finer-granularity damage count table 120. Once again, updates to the selected finer-granularity damage count table may be based on modeling of ATI/FTI effects, or other means of assigning damage counts based on write operations.

At step 416, the updated finer-granularity damage count table 120 is used to update track-level damage count tables 116. In one embodiment, for a given data track, a maximum damage count value is selected from the plurality of damage count values corresponding to a single track stored by finer-granularity damage count table 120. The maximum count value is used to update the track-level damage count table 116 for the corresponding data track.

At step 418, the updated finer-granularity damage count table 120 is written back to magnetic media 102. At step 420, the pending update total associated with the updated finer-granularity damage count table 120 is reset to zero, indicating that all pending updates have been incorporated into finer-granularity damage count table 120.

At step 422, a refresh operation is initialized in response to a track-level damage count value reaching a threshold value. However, based on updates provided by the finer-granularity damage count tables, the track-level damage count values reflect more realistic estimates of damage associated with each data track. As a result, refresh operations are initialized relatively infrequently.

Figure 5:
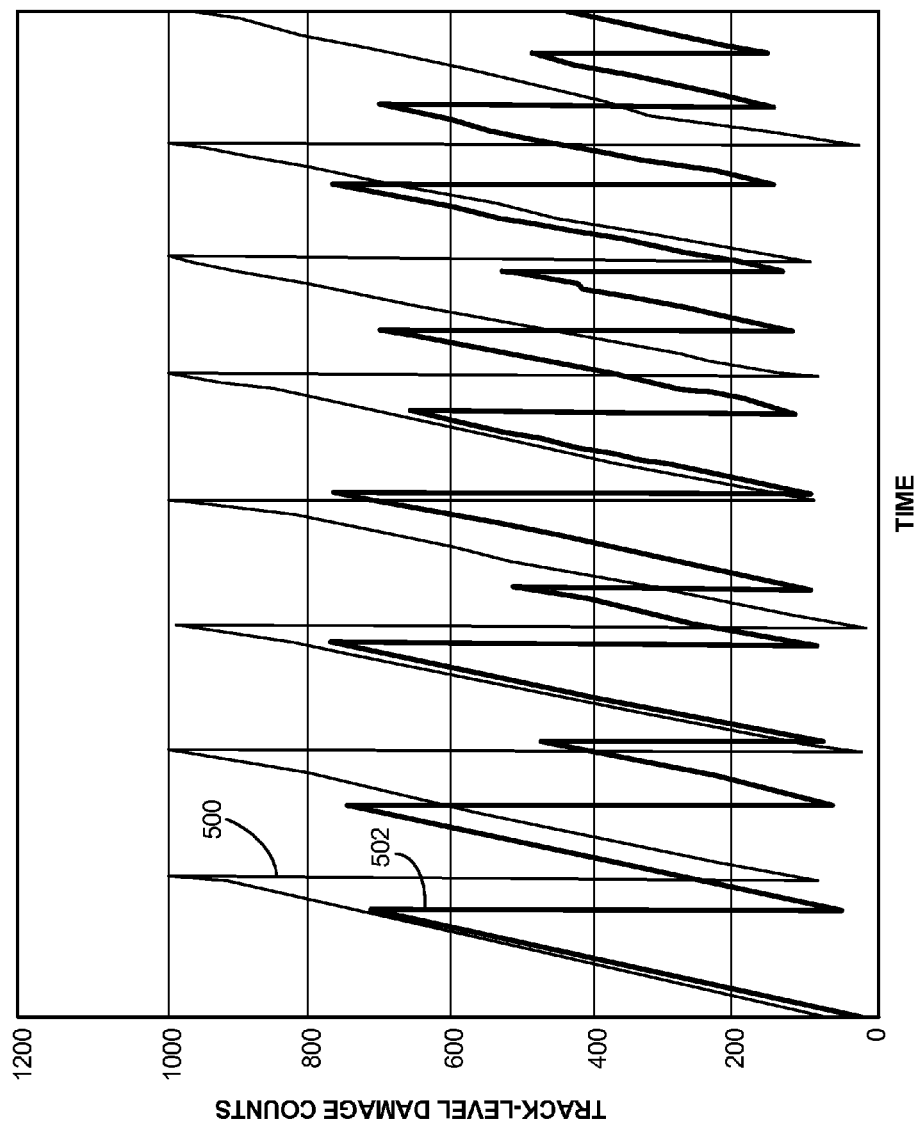
FIG. 5 is a chart contrasting track-level damage counters generated with a traditional refresh algorithm with those generated with a refresh algorithm according to an embodiment of the present invention.

FIG. 5 is a chart comparing track-level damage counter values generated in a traditional refresh algorithm with track-level damage counter values generated in a refresh algorithm according to an embodiment of the present invention. The vertical axis illustrates track-level damage count values stored by a track-level damage count table. The horizontal axis illustrates time. The thin line 500 illustrates the value of track-level damage count values over time according to the traditional refresh algorithm. When the track-level damage count value reaches a threshold value (e.g., 1000 in the example provided), a data refresh operation is initialized. The thick line 502 illustrates the value of track-level damage count values when corrected with damage counts from finer-granularity damage count table.

The traditional refresh algorithm illustrated by solid-line 500 illustrates that track-level damage count values increase at a relatively constant rate, without correction, until the threshold limit is reached. When the threshold limit is reached, data is rewritten to magnetic media 102 (shown in FIG. 1) as part of a refresh operation.

In contrast, the thick line 502 illustrates the value of track-level damage count values increasing at the same rate as the traditional method. However, prior to the threshold limit being reached, the track-level damage count table is updated with data from the finer-granularity damage count table. As a result, the track-level damage count values are revised lower, thereby preventing initialization of refresh operations. As shown in FIG. 5, the track-level damage count values increase over time, but avoid costly refresh operations as compared with the traditional refresh algorithm. In the example shown in FIG. 5, through the end of the simulation, no refresh operations have been initiated with respect to refresh algorithm employed according to an embodiment of the present invention. In contrast, eight (8) refresh operations were initiated with respect to the traditional refresh algorithm, wherein each refresh operation requires re-writing of data to identified data tracks, which decreases the overall performance of the magnetic storage device.

Figure 6:
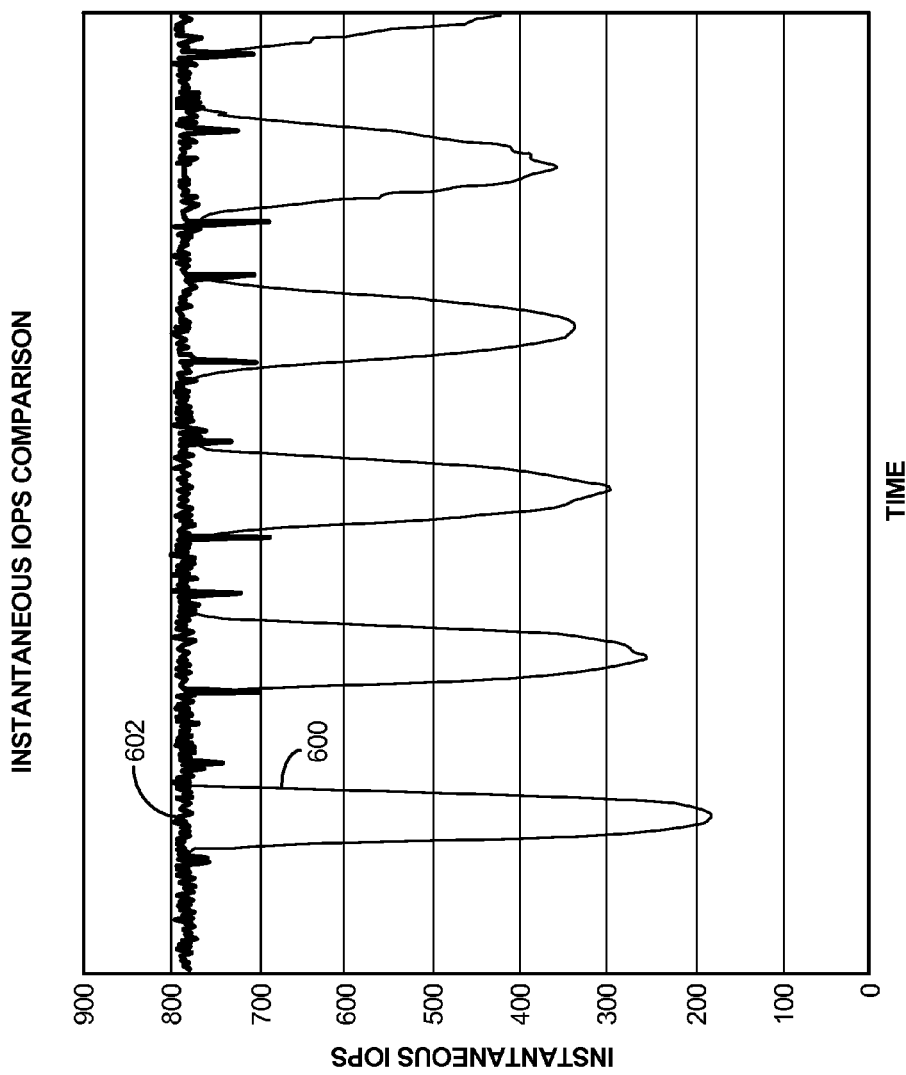
FIG. 6 is a chart contrasting input/output operations per second (IOPS) generated using a traditional refresh algorithm with IOPS generated using the refresh algorithm according to an embodiment of the present invention.

FIG. 6 is a chart comparing performance (measured as input/output operations per second (IOPS)) of a system relying on a traditional refresh algorithm and a system relying on the refresh algorithm according to an embodiment of the present invention. In the simulation shown in FIG. 6, thin line 600 represents IOPS of a system utilizing a traditional refresh algorithm, while thick line 602 represents IOPS of a system utilizing a refresh algorithm according to an embodiment of the present invention. With respect to the system utilizing the traditional refresh algorithm, each time a refresh algorithm is initiated, the IOPS associated with the system decreases, in some cases, to approximately two-hundred (200) IOPS. In contrast, by avoiding refresh operations, the system utilizing the refresh algorithm according to an embodiment of the present invention maintains IOPS, on average, around eight-hundred (800) IOPS. As a result, overall performance of the magnetic recording system is improved.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of refreshing data in a magnetic storage system having random access memory and non-volatile memory, the non-volatile memory comprising a magnetic storage medium comprised of a plurality of data tracks that are coarsely partitioned, wherein each coarse partition is in turn finely partitioned, the method comprising:

storing, in the random access memory, fine data update information that identifies, by coarse and fine partition locations, data written to the magnetic storage medium;

updating, in the random access memory, a plurality of coarse-level damage count values based on the fine data update information, wherein each coarse-level damage count value represents estimated damage to one of the plurality of coarse partitions;

updating a table of finer-granularity damage counts based on the fine data update information stored to the random access memory, wherein the table of finer-granularity damage counts stores multiple damage counts associated with each of the coarse partitions associated with the table;

updating, in random access memory, the coarse-level damage count values associated with each of the plurality of coarse partitions based on updates made to the table of finer-granularity damage counts; and storing the table of finer-granularity damage counts to the non-volatile memory; and initializing a data refresh of one of the plurality of coarse partitions in response to the associated coarse-level damage count value exceeding a threshold.

2. The method of claim 1, wherein storing the table of finer-granularity damage counts to non-volatile memory includes storing the table to the magnetic media.

3. The method of claim 1, wherein storing the table of finer-granularity damage counts to non-volatile memory includes storing the table to a solid-state memory device separate from the magnetic media.

4. The method of claim 1, further including:

storing, in random access memory, a count of pending updates made to coarse partitions associated with each of the plurality of finer-granularity damage count tables stored to the non-volatile memory.

5. The method of claim 4, further including:

selecting, from the plurality of finer-granularity damage count tables stored in the non-volatile memory, a finer-granularity damage count table to update based on the count of pending updates associated with each of the plurality of tables; and loading the selected finer-granularity damage count table from the non-volatile memory into the random access memory.

6. The method of claim 5, wherein selecting, from the plurality of finer-granularity damage count tables stored in the non-volatile memory, a finer-granularity damage count table to update includes selecting the table associated with the highest count of pending updates.

7. The method of claim 1, wherein updating a table of finer-granularity damage counts based on the fine data update information includes incrementing, according to an adjacent-track interference (ATI) and far-track interference (FTI) profile, finer-granularity damage counts of regions affected by data writes indicated by the fine data update information.

8. The method of claim 1, wherein updating a table of finer-granularity damage counts based on the fine data update information includes resetting to zero those damage counts re-written with new data according to the fine data update information.

9. The method of claim 1, wherein updating, in random access memory, the coarse-level damage count values associated with each of the plurality of coarse partitions includes selecting a largest value from the updated table of finer-granularity damage counts associated for each of the plurality of coarse partitions.

10. The method of claim 1, wherein each of the coarse partitions corresponds with one of the plurality of data tracks and each of the fine partitions corresponds with one of the plurality of sectors associated with each data track.

11. A magnetic storage system comprising:

non-volatile memory that includes, at least, a magnetic storage medium having a plurality of data tracks organized into coarse partitions and fine partitions;

a random access memory (RAM); and a controller that interfaces with both the magnetic storage medium and the RAM, wherein the controller implements a refresh algorithm that determines when a coarse pardon on the magnetic storage medium should be refreshed, wherein the controller maintains in the non-volatile memory a plurality of tables, each table having finer-granularity damage counts representing damage to one or more fine partitions within each of the plurality of coarse partitions associated with the table, and maintains in the random access memory a plurality of coarse-level damage count values, each associated with one of the plurality of coarse partitions and representing estimated damage to one of the plurality of coarse partitions, based on data written to the plurality of data tracks, wherein the controller utilizes finer-granularity damage counts stored in the plurality of tables to update the coarse-level damage count values and determines when to initiate a refresh operation based on the coarse-level damage count values.

12. The magnetic storage system of claim 11, wherein the controller maintains in random access memory fine data update information that identifies, by coarse partition and fine partition, data written to the magnetic storage medium and a count of total updates to a group of data coarse partitions associated with one of the plurality of tables.

13. The magnetic storage system of claim 11, wherein the plurality of tables having finer-granularity damage counts are stored in the magnetic storage medium.

14. The magnetic storage system of claim 11, wherein the non-volatile memory further includes a solid-state memory, wherein the plurality of finer-granularity damage count tables are stored in the solid-state memory.

15. The magnetic storage system of claim 11, wherein the controller selects one of the plurality of tables stored in the non-volatile memory to update based on the count of total updates associated with each of the plurality of tables.

16. The magnetic storage system of claim 15, wherein the table selected by the controller to update is the table corresponding with the highest count of total updates.

17. The magnetic storage system of claim 15, wherein the controller stores the selected table to the random access memory and updates the finer-granularity damage counts associated with the selected table based on the fine data update information stored to the random access memory and associated with the selected table.

18. The magnetic storage system of claim 17, wherein the controller updates the finer-granularity damage counts associated with the selected table by incrementing, according to an adjacent-track interference/far-track interference (ATI/FTI) profile, damage counts of regions affected by data write operations as indicated by the fine data update information.

19. The magnetic storage system of claim 17, wherein the controller updates the finer-granularity damage counts associated with the selected table by resetting to zero those fine partitions re-written with new data according to the fine data update information.

20. The magnetic storage system of claim 17, wherein after the controller updates the finer-granularity damage counts associated with the selected table, the controller updates the coarse-level damage count values associated with each of the plurality of coarse partitions based on updates made to the selected table.

21. The magnetic storage system of claim 20, wherein the controller initiates the refresh operation for a particular coarse partition when the coarse-level damage count value associated with the particular coarse partition exceeds a threshold value.

22. The magnetic storage system of claim 11, wherein each of the coarse partitions corresponds with one of the plurality of data tracks and each of the fine partitions corresponds with one of the plurality of sectors associated with each data track.

* * * * *